United States Patent [19]

Noguchi et al.

[11] Patent Number: 5,080,967
[45] Date of Patent: Jan. 14, 1992

[54] MAGNETIC RECORDING MEDIUM

[75] Inventors: Hitoshi Noguchi; Shinji Saito; Hiroo Inaba; Hiroshi Ogawa, all of Kanagawa, Japan

[73] Assignee: Fuji Photo Film Co., Ltd., Kanagawa, Japan

[21] Appl. No.: 420,422

[22] Filed: Oct. 12, 1989

[30] Foreign Application Priority Data

Oct. 14, 1988 [JP] Japan ................................ 63-257287

[51] Int. Cl.⁵ .............................................. G11B 23/00
[52] U.S. Cl. .................................... 428/323; 428/329; 428/336; 428/694; 428/900
[58] Field of Search ............... 428/694, 900, 329, 323, 428/336

[56] References Cited

U.S. PATENT DOCUMENTS

| | | | |
|---|---|---|---|
| 4,323,621 | 4/1982 | Kober et al. | 428/900 |
| 4,643,941 | 2/1987 | Miyoshi et al. | 428/694 |
| 4,844,946 | 7/1989 | Komatsu et al. | 428/900 |
| 4,851,289 | 7/1989 | Ogawa et al. | 428/900 |
| 4,946,740 | 8/1990 | Ono et al. | 428/900 |

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having provided thereon in this order, a first magnetic layer containing ferromagnetic particles dispersed in a binder and a second magnetic layer containing ferromagnetic particles dispersed in a binder, wherein said second magnetic layer contains particles of an abrasive material having a Mohs' hardness of 8 or more in an amount of 1 to 15 wt % based on the weight of the ferromagnetic particles contained in the second magnetic layer, said first magnetic contains particles of an abrasive material having a Mohs' hardness less than 8 in an amount of 5 to 50 wt % based on the weight of the ferromagnetic particles contained in the first magnetic layer, and the proportion of the abrasive material to the ferromagnetic particles in said first magnetic layer is larger than that in said second magnetic layer.

19 Claims, No Drawings

MAGNETIC RECORDING MEDIUM

FIELD OF THE INVENTION

This invention relates to a magnetic recording medium comprising a non-magnetic support having provided thereon a magnetic layer, and more particularly it relates to a magnetic recording medium having a magnetic layer which has a two-layer structure.

BACKGROUND OF THE INVENTION

With recent developments in magnetic recording media, there is a growing desire for a magnetic recording medium which can reproduce images or sounds of good quality. Under these circumstances, improvements in electromagnetic characteristics are being made especially by using finer ferromagnetic particles or heightening the loading of ferromagnetic particles. It is also required to diminish noises on carriers to heighten S/N, and this can be attained by making the surfaces of magnetic tapes smoother. Such smoother surfaces result in increased friction coefficients of the magnetic tapes and, hence, it is required to further improve running properties and durability. Further, magnetic recording media should be manufactured at low cost since they are nowadays selling in large quantities. As a means for meeting the above requirements, there is a recording medium having plural superposed magnetic layers, which is advantageous in that proper ferromagnetic particles can be selected so as to impart high-quality image-reproducing properties to the upper magnetic layer and also to impart high-quality sound-reproducing properties to the lower magnetic layer. The above recording medium with plural magnetic layers has another advantage that it can be produced at low cost because materials suitable for the respective magnetic layers can be used. At present, known as means for improving electromagnetic characteristics are to improve the surface properties of magnetic layers and to heighten the loading of ferromagnetic particles in magnetic layers.

In order to increase the loading of ferromagnetic particles in a magnetic layer, a method is employed in which the contents of solid ingredients other than ferromagnetic particles, i.e., a binder, a lubricating agent, an antistatic agent, an abrasive material, etc., are decreased, or a method is employed in which the loading of ferromagnetic particles is heightened by effectively dispersing the ferromagnetic particles by means of a particular dispersing agent or dispersing machine. However, the former method is disadvantageous in that the resulting magnetic tape product is poor in physical properties, particularly in the adhesive strength and tensile strength of the magnetic layer, and shows a high friction coefficient and surface electrical resistance, so that its running durability is very poor. The latter method is disadvantageous in that the dispersing step requires much time and that characteristic properties of the ferromagnetic particles are lost, particularly the acicular shape of the particles is destroyed, resulting in worsened noise levels. Hence, either method is effective for obtaining all desired properties.

As an attempt to obtain a magnetic recording medium having a high loading of ferromagnetic particles and excellent electromagnetic characteristics such as sensitivity and suitable for high-density recording, while not impairing physical properties, JP-A-58-200425 proposes a magnetic recording medium comprising a second (upper) magnetic layer having incorporated therein a lubricating agent, an antistatic agent and an abrasive material, which serve to improve running durability, and a first (lower) magnetic layer which contains no such additives because the first larger does not significantly affect the running durability of the recording medium. (The term "JP-A" as used herein means an "unexamined published Japanese patent application".) This magnetic recording medium is good in S/N, head abrasion loss and still properties, but was found to be poor in running durability because the edges of the first magnetic layer are prone to suffer damage when the tape is run while the edges are in contact with parts of a tape recorder or the like.

On the other hand, JP-A-58-9215 proposes a magnetic recording medium comprising a surface magnetic layer containing no or a slight amount of inorganic oxide fine particles such as alumina particles and a lower magnetic layer containing such inorganic particles, for the purpose of diminishing the damage or abrasion loss of magnetic head which is caused when magnetic recording media are run while in contact with the magnetic head and, further, improving the durability of the magnetic recording medium. According to this JP-A, this recording medium although its duarability is improved is free from the problem that the presence of alumina in a surface magnetic layer results in alumina particles exposed on the surface of the magnetic layer and the exposed alumina particles cause magnetic heads to suffer damage or large abrasion loss. However, the magnetic recording medium of this JP-A shows very poor still durability, although it causes little head abrasion loss because the amount of an abrasive material in the second (upper) magnetic layer is small.

SUMMARY OF THE INVENTION

Accordingly, an object of the present invention is to provide a magnetic recording medium which is improved both in still durability and in audio level that does not suffer from tape edge damage, and which also shows a good S/N.

Another object of the present invention is to provide a magnetic recording medium having improved electromagnetic characteristics as well as improved running durability and which can be manufactured with ease and at low cost.

A magnetic recording medium according to the present invention comprises a non-magnetic support having provided thereon in this order, a first magnetic layer containing ferromagnetic particles dispersed in a binder and a second magnetic layer containing ferromagnetic particles dispersed in a binder, wherein the second magnetic layer contains an abrasive material having a Mohs' hardness of 8 or more in an amount of 1 to 15 wt % based on the weight of the ferromagnetic particles contained in the second magnetic layer, the first magnetic layer contains an abrasive material having a Mohs' hardness less than 8 in an amount of 5 to 50 wt % based on the weight of the ferromagnetic particles contained in the first magnetic layer, and the proportion of the abrasive material to the ferromagnetic particles in the first magnetic layer is larger than that in the second magnetic layer.

DETAILED DESCRIPTION OF THE INVENTION

In the magnetic recording medium of this invention, the incorporation of an abrasive material having a Mohs' hardness of 8 or more in the second (upper) magnetic layer in an amount of 1 to 15 wt %, preferably 3 to 11 wt %, based on the weight of the ferromagnetic particles serves to maintain good running properties and durability, while the incorporation of an abrasive material having a Mohs' hardness less than 8 in the first (lower) magnetic layer in an amount of 5 to 50 wt %, preferably 15 to 45 wt %, based on the weight of the ferromagnetic particles serves to prevent tape edge damages while maintaining the surface properties of the lower magnetic layer.

In the second magnetic layer, if the amount of the abrasive material contained therein is less than 1 wt % based on the weight of the ferromagnetic particles or if its Mohs' hardness is less than 8, the second magnetic layer disadvantageously shows poor abrading ability, thus lowering the durability of the magnetic recording medium. If the amount thereof is larger than 15 wt %, head abrasion losses are too large and electromagnetic characteristics in a high-frequency area become poor.

In the first magnetic layer, if the amount of the abrasive material is less than 5 wt %, tape edge damages cannot be prevented, while the amount thereof larger than 50 wt % is disadvantageous in that the magnetic characteristics of the first magnetic layer are impaired, resulting in poor electromagnetic characteristics in a low-frequency area. Further, if the Mohs' hardness of the abrasive material contained in the first magnetic layer is 8 or more, the surface properties of the magnetic layer are impaired.

Examples of the abrasive material which can be used in the upper magnetic layer of the magnetic recording medium according to this invention are α-alumina, silicon nitride, boron nitride, silicon carbide, $Cr_2O_3$ and titanium carbide. It is preferred that these abrasive materials have average particle diameters of 0.6 μm or less (for example, as small as 0.15–0.5 μm), from the standpoint of obtaining smooth surfaces of magnetic layers.

Of the above-described abrasive materials, α-alumina is particularly preferred. Trade names of commercially available α-alumina include: AKP-20, AKP-30, AKP-50, AKP 100, HIT-20, HIT-50 and HIT-100 manufactured by Sumitomo Chemical Co., Ltd., Japan; and UA-5200, UA-5300, UA-5205 and UA-5305 manufactured by Showa Light Metal Industries., Ltd., Japan.

The above-described abrasive materials, which have Mohs' hardnesses of 8 or more, are used alone or in combination. That is, two or more abrasive materials different in material, Mohs' hardness, particle size or other properties can be combined for use in the upper magnetic layer.

Examples of the abrasive material which can be used in the lower magnetic layer are titanium oxide, tin oxide and red iron oxide. Of these abrasive materials, particularly preferred is red iron oxide having an average particle diameter of 0.6 μm or less, preferably 0.1 μm or less (for example, as small as 0.05–0.1 μm), from the standpoint of improving the surface properties of the magnetic layer.

In forming the lower and upper magnetic layers according to this invention, it is preferred that a coating composition for forming the upper magnetic layer is directly coated on a lower magnetic layer coating by a "wet-on-wet coating method" in such a manner that the resulting upper magnetic layer has a thickness of 2.0 μm or less, particularly 1.0 μm or less. The thickness of the lower layer is preferably 1.0 to 5.0 μm.

The abrasive material contained in the upper magnetic layer is required to be able to impart durability to the upper magnetic layer even where its amount is small, since the upper magnetic layer is run while being in contact with a magnetic head and a guide pole. If the amount of the abrasive material incorporated is too large, the loading of ferromagnetic particles becomes low, resulting in a decreased S/N ratio. Further, a too large amount of the abrasive material, which should be hard for improving durability, will make the resulting upper magnetic layer hard, so that its calender-molding properties become poor. Furthermore, a too large amount of such a particulate abrasive material also impairs the surface properties of the upper magnetic layer.

On the other hand, in the lower magnetic layer, a relatively soft abrasive material is used in an appropriate amount to increase the strength of the tape edges, thereby preventing the tape edges from suffering damage. If the amount of the abrasive material incorporated is too small, the tape edges do not have sufficient abrading power. If the amount is too large, the surface properties of the lower magnetic layer become poor because of the presence of a large amount of particles, and this adversely affects the surface properties of the upper magnetic layer. Further, even if a relatively hard abrasive material is used in the lower magnetic layer in an amount sufficient to prevent damage of the tape edges (such an amount being smaller than the amount of the soft abrasive material), the resulting magnetic layer cannot have a smooth surface because the use of a hard abrasive material in the lower magnetic layer results in poor calender-molding properties. Therefore, by the use of specific amounts of abrasive materials having different hardnesses as specified hereinbefore for the respective upper and lower magnetic layers, a magnetic recording medium having improved surface properties and free from damage of the tape edges of the lower magnetic layer can be obtained.

The ferromagnetic particles which can be used in this invention are conventional ferromagnetic fine particles. Examples thereof include γ-$Fe_2O_3$, Co-containing (-adhered, -modified or -doped) γ-$Fe_2O_3$, $Fe_3O_4$, Co-containing (-adhered, -modified or -doped) $Fe_3O_4$, $FeO_x$, Co-containing (-adhered, -modified or -doped) $FeO_x$ (x=1.33 to 1.50), $CrO_2$, $CrO_2$ containing at least one of Rn, Te, Sb, Sr, Fe, Ti, V, Mn and $Cr_2O_3$, Fe, Co, Ni, an Fe-Co alloy, an Fe-Ni alloy, an Fe-Co-Ni alloy, a Co-Ni-P alloy, a Co-Ni-Fe-B alloy, an Fe-Ni-Zn alloy, an Ni-Co alloy, a Co-Ni-Fe alloy, an Fe-Ni alloy, an Fe-Co-Cr alloy and an Mn-Bi alloy.

Such ferromagnetic particles have a particle size of about 0.005 to 1 μm and an axial length/axial width ratio of about 1/1 to 50/1. Further, these ferromagnetic particles have a specific surface area ($S_{BET}$) of about 1 $m^2$/g to 70 $m^2$/g, and a water content of 0.2 to 2.0 wt %. In the case where ferromagnetic particles of the above-described kinds are used to prepare magnetic coating compositions, the compositions have a water content of 0.00 to 2.00 wt %. Before these ferromagnetic particles are dispersed to prepare magnetic coating compositions, a dispersing agent, a lubricating agent, an antistatic agent and the like which will be described later may be adsorbed onto the surfaces of the particles, for respective purposes, by impregnating the particles with solvents containing the additives. It is preferred that ferromagnetic particles of the above-described kinds contain a heavy metal such as Sr, Pb, Mn, Ni, Cd, Cr, Al, Si, Ti, Cu or Zn in an amount of 1 wt % or less. These ferromagnetic particles may also contain alumina or the like which has been melt-adhered thereto.

The ferromagnetic particles used in this invention may also be plate-like and hexagonal crystals of barium ferrite. Such barium ferrite has a particle diameter of about 0.001 to 1 μm and a thickness of ½ to 1/20 times the diameter. The barium ferrite has a specific gravity of 4 to 6 g/cc and a specific surface area of 1 m²/g to 70 m²/g. Before the barium ferrite ferromagnetic particles are dispersed to prepare a magnetic coating composition, a dispersing agent, a lubricating agent, an antistatic agent and the like which will be described later may be adsorbed onto the surfaces of the particles, for respective purposes, by impregnating the particles with a solvent containing the additives.

The binders which can be used in the upper magnetic layer and the lower magnetic layer according to the present invention are conventional thermoplastic resins, thermosetting, reactive resins or mixtures thereof.

Thermoplastic resins which can be used in this invention are resins having a softening temperature of 150° C. or less, an average molecular weight of 10,000 to 300,000 and a degree of polymerization of about 50 to 2,000. Examples of such thermoplastic resins include a vinyl chloride-vinyl acetate copolymer, a vinyl chloride copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (for example, cellulose acetate butyrate, cellulose diacetate, cellulose triacetate, cellulose propionate, nirocellulose, ethyl cellulose, methyl cellulose, propyl cellulose, methyl ethyl cellulose, carboxymethyl cellulose, acetyl cellulose), a styrene-butadiene copolymer, a polyester resin, a chlorovinyl ether-acrylic ester copolymer, an amino resin, various thermoplastic synthetic rubbers, and mixtures thereof.

Thermosetting or reactive resins which can be used in this invention are resins having a molecular weight of 200,000 or less in the state of magnetic coating compositions and a molecular weight approaching infinity through condensation, addition or other reactions which take place when the magnetic coating compositions are heated after being applied and dried. Of such resins, preferred are ones which do not soften or melt at temperatures lower than the thermal decomposition points thereof. Examples of such thermosetting or reactive resins include a phenolic resin, a phenoxy resin, an epoxy resin, a thermosetting polyurethane resin, a urea resin, a melamine resin, an alkyd resin, a silicone resin, a reactive acrylic resin, an epoxy-polyamide resin, a nitrocellulose-melamine resin, a mixture of a high-molecular-weight polyester resin and an isocyanate prepolymer, a mixture of a methacrylate copolymer and a diisocyanate prepolymer, a mixture of a polyester polyol and a polyisocyanate, a urea-formaldehyde resin, a mixture of a low-molecular-weight glycol, a high-molecular-weight diol and triphenylmethane triisocyanate, a polyamine resin, a polyimine resin, and mixtures thereof.

The above-described resins can be used alone or in combination thereof as a binder, to which additives may be added. In each of the upper and lower magnetic layers, the amount of the binder is in the range of from 5 to 300 parts by weight per 100 parts by weight of the ferromagnetic particles. In the case where a backing layer is formed according to need, the backing layer may contain 30 to 300 parts by weight of a binder per 100 parts by weight of fine particles contained therein. Additives such as a dispersing agent, a lubricating agent, an abrasive agent, an antistatic agent, an antioxidant, a solvent, etc., can be added thereto.

It is preferred that the above-described thermoplastic resins and thermosetting or reactive resins contain one to six of the following functional groups besides the functional groups originally incorporated therein: acid radicals such as radicals of carboxylic acid, sulfinic acid, sulfenic acid, sulfonic acid, phosphoric acid, sulfuric acid and boric acid, a phosphonic radical, a phosphine radical, a sulfate radical, a phosphate radical and radicals of alkyl esters of these acids (these acid radicals may be in Na salt forms or the like); amphoteric radicals such as radicals of amino acids, aminosulfonic acids, amino-alcohol esters of sulfuric or phosphoric acid and alkyl betaines; and other radicals including an amino group, an imino group, an imido group, an amido group, an epoxy group, a hydroxyl group, an alkoxy group, a thiol group, halogen, a silyl group and a siloxane group. The content of each functional group is preferably from $1 \times 10^{-6}$ to $1 \times 10^{-2}$ equivalent per gram of the resin.

Examples of the polyisocyanates which can be used in the thermosetting or reactive resins for the binder according to the invention are isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of the above-described isocyanates with polyols; and dimer to 15-mer of isocyanates formed through condensation of an isocyanate. The average molecular weight of these polyisocyanates is preferably from 100 to 20,000. Trade names of commercially available polyisocyanates of the above kinds include: Coronate L, Coronate HL, Coronate 2030, Coronate 2031, Millionate MR and Millionate MTL (manufactured by Nippon Polyurethane Industry Co., Ltd., Japan); Takenate D-102, Takenate D-110N, Takenate D-200, Takenate D-202, Takenate 300S and Takenate 500 (manufactured by Takeda Chemical Industries, Ltd., Japan); and Sumidule T-30, Sumidule 44S, Sumidule PF, Sumidule L, Sumidule N, Desmodule L, Desmodule IL, Desmodule N, Desmodule HL, Desmodule T65, Desmodule 15, Desmodule R, Desmodule RF, Desmodule SL and Desmodule Z4273 (manufactured by Sumitomo Bayer Co., Ltd., Japan). These can be used alone or in combination of two or more thereof, utilizing the difference in curing reactivity. For the purpose of accelerating the curing reaction, the polyisocyanate can be used in combination with a hydroxyl group-containing compound (such as butanediol, hexanediol, a polyurethane having a molecular weight of 1,000 to 10,000 or water), an amino group-containing compound (such as monomethylamine, dimethylamine or trimethylamine), or a metal oxide catalyst. These hydroxyl group- or amino group-containing compounds desirably are polyfunctional. In a preferred embodiment, the amount of the polyisocyanate incorporated in the binder is from 5 to 40 wt % based on the total weight of the binder.

Examples of the lubricating agent or antioxidant which can be used in the upper or lower magnetic layer according to this invention are inorganic fine particles of molybdenum disulfide, boron nitride, graphite fluoride, calcium carbonate, barium sulfate, silicon oxide, titanium oxide, zinc oxide, tin oxide and tungsten disulfide; resin fine particles such as fine particles of an acryl-styrene resin, a benzoguanamine resin, a melamine resin, a polyolefin resin, a polyester resin, a polyamide resin, a polyimide resin and a polyethylene fluoride resin, silicone oil, fatty acid-modified silicone oil, graphite, a fluorine-containing alcohol, a polyolefin (for example polyethylene wax), a polyglycol (for example, polyethylene oxide wax), tetrafluoroethylene oxide wax, a polytetrafluoroglycol, a perfluorofatty acid, a perfluorofatty acid ester, a perfluoroalkyl ester of sulfuric acid, a perfluoroalkyl ester of phosphoric acid, an alkyl ester of phosphoric acid, a polyphenyl ether, and other organic compound lubricating agents (such as an ester of a monobasic fatty acid having 10 to 20 carbon atoms with a monohydric alcohol having 3 to 12 carbon atoms or with at least one of di-, tri-, tetra- and hexahydric alcohols having 3 to 12 carbon atoms, and a $C_{11}$–$C_{28}$ ester of a monobasic fatty acid having 10 or more carbon atoms with an alcohol having 1 to 6 hydroxyl groups). Further, a fatty acid, a fatty acid amide or an aliphatic alcohol each having 8 to 22 carbon atoms can also be used as the lubricating agent.

Specific examples of the above organic compound lubricating agents include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, anhydrosorbitan ethylene oxide monostearate, oleyl oleate, oleyl alcohol and lauryl alcohol. These can be used alone or in combination. Furthermore, so-called lubricating oil additives can also be used alone or in combination as the lubricating agent for the upper or lower magnetic layer according to this invention.

Examples of such lubricating oil additives include antioxidants (for example, alkylphenols), rust preventives (for example, naphthenic acid, alkenylsuccinic acids, dilauryl phosphate), oiliness improvers (for example, colza oil, lauryl alcohol), extreme pressure additives (for example, dibenzyl sulfide, tricresyl phosphate, tributyl phosphite), detergent dispersing agents, viscosity index improvers, pour point depressants and antifoaming agents. Such a lubricating oil additive is added in an amount of from 0.05 to 20 parts by weight per 100 parts by weight of the binder.

Carbon black can be added to the upper or lower magnetic layer according to the present invention, and examples thereof include furnace black for rubbers, thermal black for rubbers, coloring black and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Carbon blacks which fall under ASTM D 1765-82a can be used. The carbon black which can be used in this invention has an average particle size of from 5 to 1,000 m$\mu$ (electron microscope), a specific surface area as measured by the nitrogen adsorption method of from 1 to 1,500 m$^2$/g, a pH of from 2 to 13 (JIS K-6221, 1982), and an oil absorption as measured with dibutyl phthalate of from 5 to 2,000 ml/100g (JIS K-6221, 1982). The water content of the carbon black used in this invention is from 0.00 to 20 wt %. According to the present invention, carbon black having a particle size of from 5 to 100 m$\mu$ is used to reduce the surface electric resistance of a coated film, and carbon black of from 50 to 1,000 m$\mu$ is used to adjust the strength of a coated film. Further, fine carbon black of 100 m$\mu$ or smaller is used to adjust the surface roughness of a coated film and to smooth the surface for reducing the spacing loss, while coarse carbon black of 50 m$\mu$ or larger is used to roughen the surface of a coated film to decrease its friction coefficient. Thus, the kind and amount of carbon black added are determined according to the purpose of a magnetic recording medium to be produced.

Further, these carbon blacks may be surface-treated with a dispersing agent which will be described hereinafter, or may be grafted with a resin, before use. Furthermore, carbon black whose surfaces have been partly graphitized may be used, which can be obtained by treating at a furnace temperature of 2,000° C. or more in producing the carbon black. Moreover, hollow carbon black may also be used as a specific type of carbon black.

The amount of the carbon black added to the upper or lower magnetic layer is preferably from 0.1 to 20 parts by weight per 100 parts by weight of the ferromagnetic particles. Carbon blacks which can be used in this invention and physical properties thereof are referred to, for example, in "Carbon Black Binran" edited by Carbon Black Association, Japan (published in 1971).

Examples of the dispersing agent which can be used in this invention are fatty acids having 10 to 26 carbon atoms of the formula $R_1COOH$ wherein $R_1$ is an alkyl group having 9 to 25 carbon atoms (such as caprylic acid, capric acid, lauric acid, myristic acid, palmitic acid, stearic acid, behenic acid, oleic acid, elaidic acid, linolic acid, linolenic acid, stearolic acid, etc.),; metallic soaps prepared from alkali metal (Li, Na, K, $NH_4^+$, etc.) or alkaline earth metal (Mg, Ca, Ba, etc.) of the above fatty acids, Cu, Pb, etc.; amides of the above fatty acids; lecithin; and the like.

Further, higher alcohols having 4 or more carbon atoms (e.g., butanol, octyl alcohol, myristyl alcohol, stearyl alcohol, etc.), and sulfates, phosphates, amine compounds and the like of the higher alcohols can also be used as the dispersing agent.

Furthermore, polyalkylene oxides, sulfates, phosphates, amine comounds and the like of the polyalkylene oxides; sulfosuccinic acid; sulfosuccinate; and the like can be used.

A substituent such as Si, F, etc. may be introduced into those compounds in order to modify the properties thereof or a compatibility thereof with the binder.

Those dispersing agents can be used alone or as a mixture thereof, and the amount of each of the dispersing agents added is 0.005 to 20 parts by weight per 100 parts by weight of the binder.

The dispersing agent may previously be adhered on a surface of ferromagnetic fine powder, or may be added during dispersing.

Other preferred compounds as the dispersing agent are surfactants such as carboxylic acid and phosphoric acid ester, fluorine-type surfactants FLOLARD FC95, FC129, FC430, FC431, etc.

Examples of the solvent which can be used in kneading and dispersing the above-described ingredients to prepare magnetic coating compositions which are applied on a support to form a magnetic recording medium of this invention are ketone-type solvents such as acetone, methyl ethyl ketone, methyl isobutyl ketone, cyclohexanone, isophorone and tetrahydrofuran; alcohol-type solvents such as methanol, ethanol, propanol, butanol, isobutyl alcohol, isopropyl alcohol and methylcyclohexanol; ester-type solvents such as methyl acetate, ethyl acetate, butyl acetate, isobutyl acetate, isopropyl acetate, ethyl lactate and glycol acetate monoethyl ether; ether-type solvents such as diethyl ether, tetrahydrofuran glycol dimethyl ether, glycol monoethyl ether and dioxane; aromatic hydrocarbons such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethyl-formamide; and hexane. These solvents can be used alone or in combination of two or more thereof at any desired proportions.

The method for kneading is not particularly limited, and the order of adding the components can be suitably determined. For preparing magnetic coating compositions for forming the upper and lower magnetic layers and a coating composition for forming a backing layer, a conventional kneading machine can be used. Examples of the kneading machine are a two-roll mill, a three-roll mill, a ball mill, a pebble mill, a tron mill, a sand grinder, a Szegvari attritor, a high-speed impeller, a dispersing machine, a high-speed stone mill, a high-speed impact mill, a disper, a kneader, a high-speed mixer, a ribbon blender, a Ko-Kneader, an intensive mixer, a tumbler, a blender, a disperser, a homogenizer, a single-screw extruder, a twin-screw extruder or an ultrasonic dispersing device. Details of kneading techniques are described in "Paint Flow and Pigment Dispersion" written by T. C. PATTON, published by John Wiley & Sons in 1964; "Kōgyō Zairyō" vol. 25, 37 (1977), written by Shinichi Tanaka; and references cited therein. Two or more of these kneading machines can be suitably combined to continuously feed and apply coating compositions. Further, reference is also made to U.S. Pat. Nos. 2,581,414 and 2,855,156. According to a method described in the above-described literatures and references cited therein, the necessary ingredients are kneaded and dispersed to prepare magnetic coating compositions for forming the upper and lower magnetic layers and a coating composition for forming a backing layer.

For forming the upper and lower magnetic layers, magnetic coating compositions prepared by dissolving or dispersing ingredients which are properly selected from those as described above, in organic solvents are coated on a support, and then dried. In the case where the magnetic recording medium to be produced is used in the form of a tape, the thickness of the support is generally from about 2.5 to 100 $\mu$m, preferably from about 3 to 70 $\mu$m. In the case where the product is used in the form of a disk or a card, the thickness of the support is generally from about 0.03 to 10 mm. In the case of a drum, a cylindrical support can be used.

Materials for the support are polyesters such as polyethylene terephthalate and polyethylene naphthalate; polyolefins such as polypropylene and polyethylene; cellulose derivatives such as cellulose triacetate and cellulose diacetate; vinyl resins such as polyvinyl chloride and polyvinylidene chloride; other plastics such as polycarbonates, polyamides and polysulfone; metals such as aluminum and copper; and ceramics such as glass. Prior to coating with the magnetic coating compositions, these supports may be subjected to a corona discharge treatment, a plasma treatment, an undercoating treatment, a heat treatment, a dust-removing treatment, a metal deposition treatment or an alkali treatment. These supports are disclosed in, for example, West German Patent 3338854A, JP-A-59-116926, U.S. Pat. No. 4,388,368 and "Sen-i to Kōgyō (Fibers and Industry)" vol. 31, pp. 50-55 (1975) written by Yukio Mitsuishi.

For applying the magnetic coating compositions on the support to form the above-described upper and lower magnetic layers and for applying a coating composition to form a backing layer, the following coating methods can be employed: air doctor coating, blade coating, air knife coating, squeeze coating, impregnation coating, reverse roll coating, transfer roll coating, gravure coating, kiss coating, cast coating, spray coating, bar coating, spin coating or other coating methods. These coating methods are explained in detail in "Coating Kōgyō (Coating Industry)" pp. 253-277, published by Asakura Shoten, Japan, in Mar. 20, 1971. It is particularly preferred according to this invention to employ a so-called "wet-on-wet coating method" in which a magnetic coating composition for forming the lower magnetic layer is coated on the support, and a magnetic coating composition for forming the upper magnetic layer is then directly coated on the lower magnetic layer coating which has not yet been dried.

The coating method described in JP-A-61-139929 can be employed as the "wet-on-wet coating method".

Further, the details of the above-described method of dispersing the ferromagnetic particles into the binders and method of coating the magnetic coating compositions on a support are described in, for example, JP-A-54-46011 and JP-A-54 21805.

The magnetic coating compositions which have been coated on the support by the above method are, if desired and necessary, immediately subjected to a treatment in which the ferromagnetic particles contained in the applied compositions are oriented to a desire direction while the compositions are being dried, and then the resulting compositions are dried completely, thereby forming magnetic layers. In the above drying, the traveling speed for the support is generally from 10 m/min to 1,000 m/min, and the drying temperature is regulated between 20° C. and 130° C. If desired and necessary, the thus-obtained layered structure is subjected to a surface-smoothing treatment and cut into a desired shape. Thus, a magnetic recording medium of the present invention is produced. It is preferred that the above-described method for producing a magnetic recording medium of this invention is practiced by continuously conducting the steps of filler-surface treatment, kneading (dispersion), coating, heat treatment, calendering, irradiation (Electron Beam), surface polishing and cutting. If desired and necessary, these steps may be divided into one or more groups.

In conducting each of these steps, the ambience is regulated so as to have a temperature between 10° C.

and 30° C. and an absolute humidity between 5 mg/m³ and 20 mg/m³. These conditions are described in, for example, JP-B-40-23625, JP-B-39-28368 and U.S. Pat. No. 3,473,960. (The Term "JP-B" as used herein means an "examined Japanese patent publication".) Further, it is thought that the method described in JP-B-41-13181 is a basic and important technique in this field.

The present invention will be described in more detail by reference to the following Examples.

It should be noted that the following Examples should not be construed to be limiting the scope of the invention. In the Examples, all parts are by weight.

EXAMPLE

Composition 1 (First Layer)

| | |
|---|---|
| Co-γ-FeO$_x$ | 100 parts |
| (x = 1.45; coercive force, 650 Oe; S$_{BET}$. 28 m²/g) | |
| Abrasive material | Amount shown in Table 1 |
| Vinyl chloride-vinyl acetate copolymer (carboxyl group content, 6%; degree of polymerization, 420) | 20 parts |
| Polyester polyurethane | 5 parts |
| Polyisocyanate (Coronate L) | 6.7 parts |
| Stearic acid (for industrial use) | 2 parts |
| Butyl stearate (for industrial use) | 1 part |
| Methyl ethyl ketone/cyclohexanone (8/2 volume ratio) | 200 parts |

Composition 2 (Second Layer)

| | |
|---|---|
| Co-γ-FeO$_x$ | 100 parts |
| (x = 1.45; coercive force, 700 Oe; S$_{BET}$. 35 m²/g) | |
| Abrasive material | Amount shown in Table 1 |
| Vinyl chloride-vinyl acetate copolymer (carboxyl group content, 6%; degree of polymerization, 420) | 20 parts |
| Polyester polyurethane | 5 parts |
| Polyisocyanate (Coronate L) | 6.7 parts |
| Stearic acid (for industrial use) | 3 parts |
| Butyl stearate (for industrial use) | 2 parts |
| Methyl ethyl ketone/cyclohexanone (8/2 volume ratio) | 200 parts |

With respect to each of the above compositions, the ingredients were thoroughly mixed to disperse the particulate ingredients. Thus, magnetic coating compositions for forming an upper magnetic layer and a lower magnetic layer, respectively, were prepared. The thus-obtained magnetic coating compositions were coated on a 14μ-thick polyethylene terephthalate support in such amounts that the resulting upper magnetic layer and lower magnetic layer respectively had a dry thickness of 0.6μ and 3.2μ, respectively, and then dried. The resulting layered structure was subjected to a surface-smoothing treatment and then cut into a ½-inch magnetic tape.

The thus-obtained tape samples, Nos. 1–27, were evaluated for the properties given below, and the results are shown in Table 1.

In Table 1, Sample Nos. 3, 8, 12–14, 18 and 24–27 are comparative magnetic tapes and the other samples are magnetic tapes of this invention.

PROPERTIES AND MEASURING METHODS

Head Abrasion Loss

Using a video tape recorder, NV-G21 manufactured by Matsushita Electric Industrial Co., Ltd., Japan, a tape sample was run for 100 hours. Before and after the running, the height of the head from the cylinder surface was measured, and the resulting abrasion loss of the head was calculated therefrom.

Still Properties

Picture signals of 50% white were recorded and then reproduced in the still mode, while the reproduced RF output level was recorded by a recorder. The time period required for the signal level to decrease one-half was measured.

Y-S/N

The S/N (signal/noise) was measured using a noise meter, 925R manufactured by Shibasoku Co., Ltd., Japan, and the results are shown in Table 1 in terms of relative values compared with Sample No. 26 which was regarded as a standard tape. That is, signals were recorded on each tape sample with video tape recorder NV-8200 manufactured by Matsushita Electric Industrial Co., Ltd., Japan, and the noise on the tape was measured with the noise meter using a high-pass filter (10 KHz) and a low-pass filter (4.2 MHz).

C-S/N

Measurements were made using the above-described noise meter 925R, a high-pass filter (10 KHz) and a low-pass filter (500 KHz AM). Recording was conducted using the above-described video tape recorder NV-8200. The results are shown in Table 1 in terms of relative values compared with Sample No. 26 being regarded as a standard tape (0 dB).

Audio Level Down

Sine wave signals of 1 KHz were recorded on each tape sample over the whole length of the tape, at an input level 10 dB lower than the normal level and at the normal bias. The signals on the tape were reproduced, and the reproduced output level was recorded by a recorder. On the resulting chart of output variations, the maximum variation was read and is shown in Table 1 in terms of dB value.

TABLE 1

| Sample No. | Abrasive Materials ||||||  Proportion of abrasive materials (A)/(B) | Properties |||||
|---|---|---|---|---|---|---|---|---|---|---|---|---|
| | Upper (second) magnetic layer ||| Lower (first) magnetic layer ||| | | | Head abrasion loss (μm) | Still property (min) | Audio level down (dB) |
| | Kind (Mohs' hardness) | Particle diameter (μm) | Amount (A) (part) | Kind (Mohs' hardness) | Particle diameter (μm) | Amount (A) (part) | | Y-S/N (dB) | C-S/N (dB) | | | |
| 1 | α-alumina (9) | 0.4 | 4 | red iron oxide (5.5) | 0.7 | 15 | 0.26 | +2.3 | +1.8 | 3 | 120 | −0.4 |
| 2 | α-alumina (9) | 0.4 | 4 | red iron oxide (5.5) | 0.6 | 15 | 0.26 | +2.6 | +2.0 | 3 | 120 | −0.4 |
| 3 | α-alumina (9) | 0.4 | 4 | — | — | — | ∞ | +2.8 | +2.3 | 3 | 120 | −10.0 |

TABLE 1-continued

| | Abrasive Materials | | | | | | Propor- tion of abrasive materials (A)/(B) | Properties | | | | |
|---|---|---|---|---|---|---|---|---|---|---|---|---|
| | Upper (second) magnetic layer | | | Lower (first) magnetic layer | | | | | | Head abrasion loss (μm) | Still prop- erty (min) | Audio level down (dB) |
| Sam- ple No. | Kind (Mohs' hardness) | Particle diameter (μm) | Amount (A) (part) | Kind (Mohs' hardness) | Particle diameter (μm) | Amount (A) (part) | | Y-S/N (dB) | C-S/N (dB) | | | |
| 4 | α-alumina (9) | 0.4 | 4 | red iron oxide (5.5) | 0.1 | 5 | 0.8 | +2.8 | +2.3 | 3 | 120 | −1.5 |
| 5 | α-alumina (9) | 0.4 | 4 | red iron oxide (5.5) | 0.1 | 15 | 0.26 | +2.8 | +2.3 | 3 | 120 | −1.0 |
| 6 | α-alumina (9) | 0.4 | 4 | red iron oxide (5.5) | 0.1 | 30 | 0.13 | +2.9 | +2.0 | 3 | 120 | −0.7 |
| 7 | α-alumina (9) | 0.4 | 4 | red iron oxide (5.5) | 0.1 | 50 | 0.08 | +2.9 | +1.9 | 3 | 120 | −0.5 |
| 8 | α-alumina (9) | 0.4 | 4 | red iron oxide (5.5) | 0.1 | 60 | 0.06 | +2.2 | +1.0 | 3 | 120 | −0.4 |
| 9 | α-alumina (9) | 0.4 | 4 | titanium oxide (6.5) | 0.1 | 5 | 0.8 | +2.3 | +1.8 | 3 | 120 | −2.0 |
| 10 | α-alumina (9) | 0.4 | 4 | titanium oxide (6.5) | 0.1 | 15 | 0.26 | +2.3 | +1.8 | 3 | 120 | −1.5 |
| 11 | α-alumina (9) | 0.4 | 4 | titanium oxide (6.5) | 0.1 | 50 | 0.08 | +2.4 | +1.6 | 3 | 120 | −1.0 |
| 12 | α-alumina (9) | 0.4 | 4 | α-alumina (9) | 0.1 | 15 | 0.26 | +1.5 | +0.8 | 3 | 120 | −0.5 |
| 13 | α-alumina (9) | 0.4 | 4 | Cr$_2$O$_3$ (8.5) | 0.1 | 15 | 0.26 | +1.2 | +0.5 | 3 | 120 | −0.5 |
| 14 | α-alumina (9) | 0.4 | 0.4 | red iron oxide (5.5) | 0.1 | 15 | 0.02 | +3.1 | −2.5 | 1 | 40 | −1.3 |
| 15 | α-alumina (9) | 0.4 | 1 | red iron oxide (5.5) | 0.1 | 15 | 0.06 | +3.0 | +2.5 | 2 | 100 | −1.2 |
| 16 | α-alumina (9) | 0.4 | 4 | red iron oxide (5.5) | 0.1 | 15 | 0.26 | +2.8 | +2.3 | 3 | 120 | −1.0 |
| 17 | α-alumina (9) | 0.4 | 15 | red iron oxide (5.5) | 0.1 | 15 | 1.0 | +2.5 | +2.3 | 3 | 120< | −1.0 |
| 18 | α-alumina (9) | 0.4 | 17 | red iron oxide (5.5) | 0.1 | 15 | 1.13 | +1.7 | +1.5 | 5 | 120< | −0.9 |
| 19 | α-alumina (9) | 0.6 | 6 | red iron oxide (5.5) | 0.1 | 15 | 0.4 | +2.5 | +2.3 | 3 | 120 | −1.0 |
| 20 | α-alumina (9) | 0.7 | 6 | red iron oxide (5.5) | 0.1 | 15 | 0.4 | +2.2 | +1.9 | 3 | 120 | −1.0 |
| 21 | Cr$_2$O$_3$ (8.5) | 0.4 | 1 | red iron oxide (5.5) | 0.1 | 15 | 0.06 | +2.3 | +2.1 | 3 | 120< | −0.9 |
| 22 | Cr$_2$O$_3$ (8.5) | 0.4 | 6 | red iron oxide (5.5) | 0.1 | 15 | 0.4 | +2.2 | +2.0 | 3.5 | 120< | −1.0 |
| 23 | Cr$_2$O$_3$ (8.5) | 0.4 | 15 | red iron oxide (5.5) | 0.1 | 15 | 1.0 | +2.0 | +2.0 | 3.5 | 120< | −1.0 |
| 24 | red iron oxide (5.5) | 0.4 | 6 | red iron oxide (5.5) | 0.1 | 15 | 0.4 | +2.8 | +2.3 | 1 | 50 | −0.0 |
| 25 | titanium oxide (6.5) | 0.4 | 6 | red iron oxide (5.5) | 0.1 | 15 | 0.4 | +2.8 | +2.3 | 1 | 50 | −1.0 |
| 26 | α-alumina (9) | 0.4 | 4 | (not formed) | | | | +0.0 | +0.0 | 3 | 120 | −0.3 |
| 27 | red iron oxide (5.5) | 0.1 | 15 | (not formed) | | | | −2.0 | +2.5 | 1 | 50 | −1.0 |

While the invention has been described in detail and with reference to specific embodiments thereof, it will be apparent to one skilled in the art that various changes and modifications can be made therein without departing from the spirit and scope thereof.

We claim:

1. A magnetic recording medium comprising a non-magnetic support having provided thereon in this order, a first magnetic layer containing ferromagnetic particles dispersed in a binder and a second magnetic layer containing ferromagnetic particles dispersed in a binder, wherein
   said second magnetic layer contains particles of an abrasive material having a Mohs' hardness of 8 or more in an amount of 1 to 15 wt % based on the weight of the ferromagnetic particles contained in the second magnetic layer,
   said first magnetic layer contains particles of an abrasive material having a Mohs' hardness less than 8 in an amount of 5 to 50 wt % based on the weight of the ferromagnetic particles contained in the first magnetic layer, and
   the proportion of the abrasive material to the ferromagnetic particles in said first magnetic layer is larger than the proportion of the abrasive material to the ferromagnetic particles in said second magnetic layer.

2. The magnetic recording medium of claim 1, wherein the abrasive material used in the second magnetic layer is selected from the group consisting of α-alumina, silicone nitride, boron nitride, silicone carbide, Cr$_2$O$_3$ and titanium carbide.

3. The magnetic recording medium of claim 1, wherein the abrasive material in the second magnetic layer has a particle diameter of 0.6 μm or less.

4. The magnetic recording medium of claim 2, wherein the abrasive material is α-alumina.

5. The magnetic recording medium of claim 1, wherein the asbrasive material used in the first magnetic layer is selected from the group consisting of titanium oxide, tin oxide and red iron oxide.

6. The magnetic recording medium of claim 5, wherein the abrasive material is red iron oxide.

7. The magnetic recording medium of claim 1, wherein the abrasive material used in the first magnetic layer has an average particle diameter of 0.6 μm or less.

8. The magnetic recording medium of claim 7, wherein the particle diameter of the abrasive material in the first magnetic layer is 0.1 μm or less.

9. The magnetic recording medium of claim 1, wherein the first and second magnetic layers are coated by a wet-on-wet coating method.

10. The magnetic recording medium of claim 1, wherein the second magnetic layer has a thickness of 2.0 μm or less.

11. The magnetic recording medium of claim 10, wherein the thickness of the second magnetic layer is 1.0 μm or less.

12. The magnetic recording medium of claim 1, wherein the ferromagnetic particles are selected from the group consisting of $\gamma\text{-}Fe_2O_3$, Co-containing (-adhered, -modified or -doped) $\gamma\text{-}Fe_2O_3$, $Fe_3O_4$, Co-containing (-adhered, -modified or -doped) $Fe_3O_4$, $FeO_x$, Co-containing (-adhered, -modified or -doped) $FeO_x$ (x=1.33 to 1.50), $CrO_2$, $CrO_2$ containing at least one of Rn, Te, Sb, Sr, Fe, Ti, V, Mn and $Cr_2O_3$, Fe, Co, Ni, an Fe-Co alloy, an Fe-Ni alloy, an Fe-Co-Ni alloy, a Co-Ni-P alloy, a Co Ni-Fe-B alloy, an Fe-Ni-Zn alloy, an Ni-Co alloy, a Co-Ni-Fe alloy, an Fe-Ni alloy, an Fe-Co-Cr alloy and an Mn-Bi alloy.

13. The magnetic recording medium of claim 1, wherein the ferromagnetic particles have a particle size of about 0.005 to 1 μm and axial length/axial width reatio of about 1/1 to 50/1.

14. The magnetic recording medium of claim 1, wherein the ferromagnetic particles have a specific surface area of about 1 $m^2/g$ to 70 $m^2/g$ and a water content of 0.2 to 2.0 weight %.

15. The magnetic recording medium of claim 1, wherein the ferromagnetic particles include a heavy metal selected from the group consisting of Sr, Pb, Mn, Ni, Cd, Cr, Al, Si, Ti, Cu and Zn in an amount of 1 weight % or less.

16. The magnetic recording medium of claim 1, wherein the ferromagnetic particles are barium ferrite.

17. The magnetic recording medium of claim 1, wherein the binder in each of said first and second layers is a thermoplastic resin, a thermosetting resin, a reactive resin or a mixture thereof.

18. The magnetic recording medium of claim 1, wherein the binder is present in each of said first and second layers in the range of about 5 to 300 parts by weight per 100 parts by weight of the ferromagnetic particles.

19. The magnetic recording medium of claim 1, wherein carbon black is added to at least one of the first and second magnetic layers.

* * * * *